July 23, 1940.  W. G. HOFFMAN  2,209,120
POWER TRANSMISSION MECHANISM
Filed June 29, 1939  2 Sheets-Sheet 1
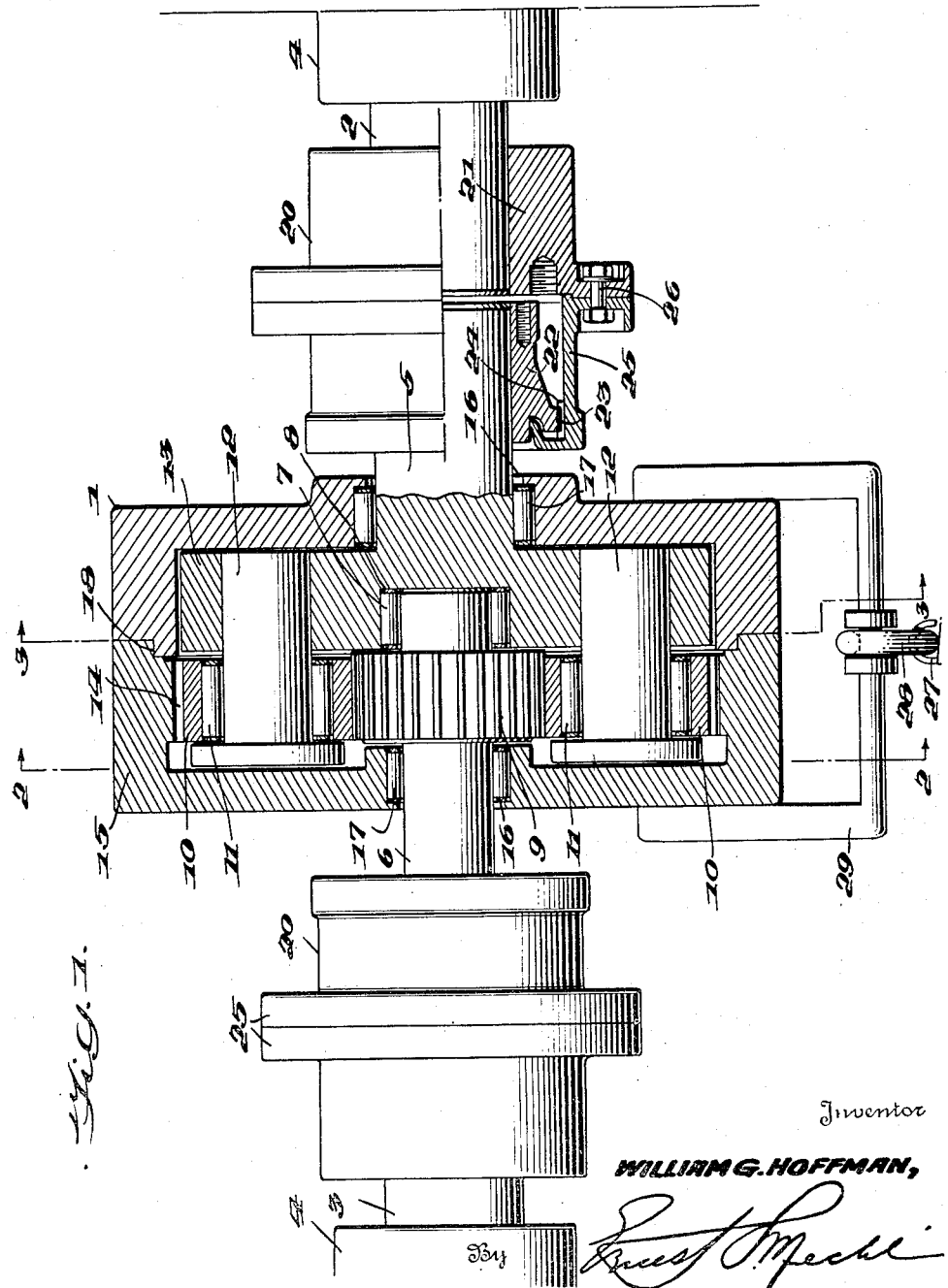
Inventor
WILLIAM G. HOFFMAN,
By
His Attorney July 23, 1940.  W. G. HOFFMAN  2,209,120
POWER TRANSMISSION MECHANISM
Filed June 29, 1939   2 Sheets-Sheet 2
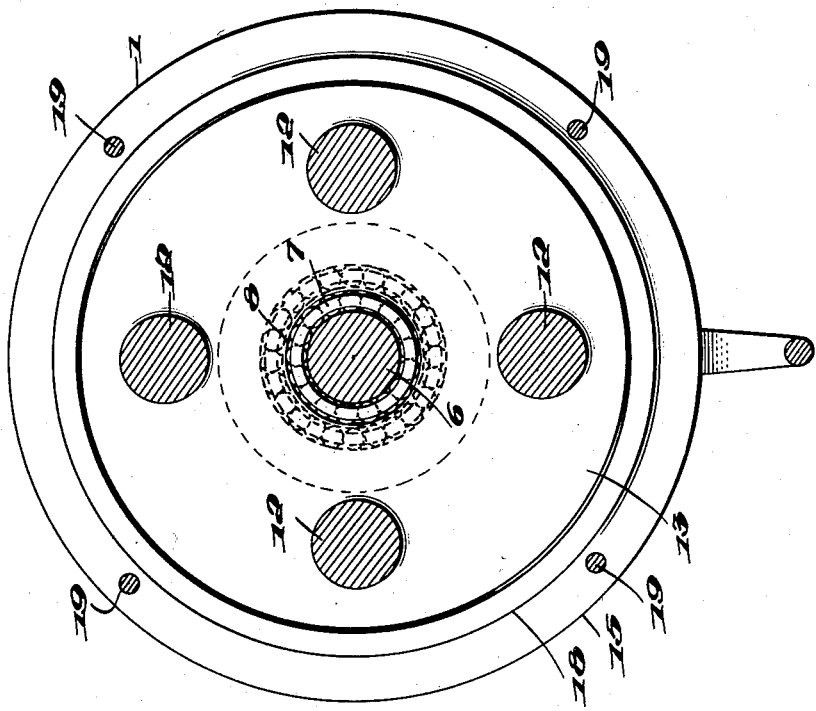
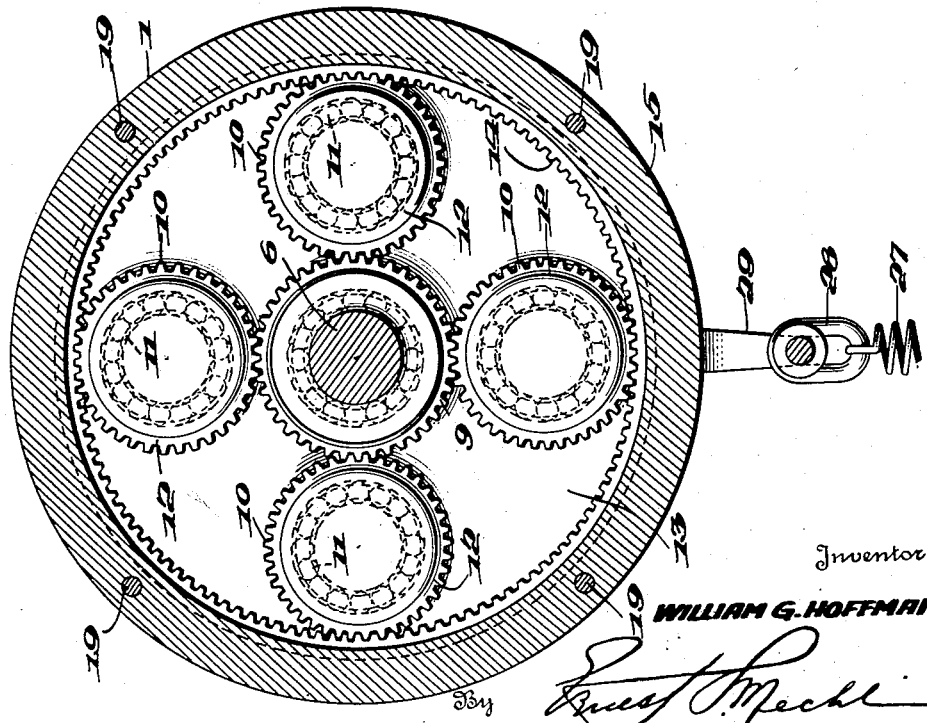
Inventor
WILLIAM G. HOFFMAN, Patented July 23, 1940

2,209,120

UNITED STATES PATENT OFFICE 2,209,120

POWER TRANSMISSION MECHANISM

William G. Hoffman, Baltimore, Md.

Application June 29, 1939, Serial No. 281,975

3 Claims. (Cl. 74—305)

My invention relates to power transmission mechanism of the type having a speed changing unit and it has for its principal object the provision of means whereby the speed changing unit will be substantially free of or subjected to only a minimum of eccentric stresses should the axes of the driving and driven members with which the unit is associated be out of alignment.

A primary feature of the invention consists in connecting a speed changing unit of the planetary gear type to driving and driven members by flexible couplings which constitute the sole support of the unit and in also providing means for restraining movement of the internally toothed ring gear of the speed changing unit to enable the latter to transmit power, said means being of a character permitting the axis of the unit to move angularly with respect to the axes of the driving and driven members.

Other and more specific features of the invention, residing in advantageous forms, combinations and relations of parts, will hereinafter appear and be pointed out in the claims.

In the drawings,

Figure 1 is a view partly in side elevation and partly in section illustrating the preferred embodiment of the invention.

Figure 2 is a sectional view taken on line 2—2 of Figure 1.

Figure 3 is a sectional view taken on line 3—3 of Figure 1.

Referring more particularly to the drawings, 1 indicates a speed changing unit of the planetary gear type and 2 and 3 respectively indicate the shafts or members with which the speed changing unit is associated. Each of the shafts is journaled in a suitably located bearing 4. Shaft 2 may be the member by which power is transmitted through the speed changing unit to shaft 3 in which event shaft 2 will be the driving member and shaft 3 the driven member, or shaft 3 may be the member by which power is transmitted through the speed changing unit to shaft 2 in which event shaft 3 will be the driving member and shaft 2 the driven member.

The speed changing unit has oppositely extending shafts 5 and 6, the outer ends of which are coupled, by means to be hereinafter described, to the shafts 2 and 3. Shaft 6, whose inner end is supported in a suitable bearing such as a roller bearing 7 disposed within a recess 8 in the inner end of shaft 5, is rigidly provided with a pinion or sun gear 9 which is in mesh with a plurality of pinions or planet gears 10 revolubly mounted on suitable bearings 11 carried by pins or studs 12 projecting laterally from one side of a disk 13 with which the inner end of shaft 5 is integrally formed. Surrounding the planet gears 10 is an internally toothed ring gear 14 which is preferably formed integrally with one part of a two-piece housing 15 enclosing the speed changing unit. The opposite sides of the housing are provided with concentrically arranged openings 16 through which the shafts 5 and 6 respectively extend, the shafts being journaled in the openings in any convenient manner as by bearings 17. The meeting faces of the two parts of the housing 15 are preferably stepped or shouldered, as indicated at 18, so that the bolts 19 by which the two parts of the housing are rigidly connected will not be subject to shearing strains. To enable the speed changing unit to transmit power imparted to it means, to be hereinafter described, is provided for restraining rotation of the ring gear 14.

The coupling members 20 which may advantageously be employed for connecting the speed changing unit to shafts 2 and 3 and which constitute the sole support for the unit are of identical construction and each includes a pair of hubs 21 and 22 respectively, which are rigidly secured in any suitable manner (not shown) to the shafts on which they are respectively mounted. Instead of mounting hubs 21 on shafts 5 and 6, respectively, and hubs 22 on shafts 2 and 3, respectively, it is preferred that hubs 21 be mounted on the latter shafts and hubs 22 on the former shafts. Each of hubs 22 is formed on its periphery with gear teeth 23 which mesh with teeth 24 formed on the interior of a sleeve 25 which encircles hub 22 and is rigidly connected to hub 21 by bolts 26. Being thus geared together, the hubs function as a rigid unit to transmit rotary motion between the shafts which they couple and at the same time they enable the axis of shafts 5 and 6 to angle slightly with respect to the axes of shafts 2 and 3, so as to compensate for misalignment of the latter without subjecting any of the shafts to a reversal of stresses. As the couplings constitute the sole support for the speed changing unit, it will be evident that the unit is free, unless restrained by some external force, to assume a "neutral" position, that is a position in which it will be substantially free of or at the most will be subjected to only a minimum of eccentric forces.

To prevent the setting up of external forces which might keep the speed changing unit from assuming a neutral position, the means which is employed for restraining movement of the in- —ternally toothed ring gear 14 is of such character as to enable the axis of the speed changing unit to move angularly with respect to the axes of the shafts 2 and 3.

While any suitable means having the characteristic indicated may be employed for accomplishing this result, the particular means illustrated in the drawings comprises a spring 27 anchored at one end to a fixed support (not shown) and connected at its other end by a link 28 to a yoke 29 which is connected to the housing 15 with which the ring gear 14 is integrally formed. By providing a flexible means of this character for restraining rotation of the ring gear, it will be perceived that not only is the axis of the speed changing unit enabled to move angularly but it will have a dampening effect on the driving torque initially transmitted to the unit.

What I claim is:

1. Power transmission mechanism including a driving shaft, a driven shaft, a speed changing unit of the planetary gear type having an internally toothed ring gear adapted to be restrained against rotation to enable said unit to transmit power, said unit being operatively interposed between the driving and driven shafts and having oppositely extending shafts, flexible couplings respectively connecting the driving and driven shafts to said oppositely extending shafts, said couplings constituting the sole support of said speed changing unit, and means for restraining rotation of the ring gear of the speed changing unit, said means and flexible couplings enabling the speed changing unit to assume a position with respect to the driving and driven shafts such that it will be subject to a minimum of eccentric stresses.

2. Power transmission mechanism including a driving shaft, a driven shaft, a speed changing unit of the planetary gear type having an internally toothed ring gear adapted to be restrained against rotation to enable said unit to transmit power, said unit being operatively interposed between the driving and driven shafts and having oppositely extending shafts, flexible couplings respectively connecting the driving and driven shafts to said oppositely extending shafts, said couplings constituting the sole support of said speed changing unit and each including a peripherally toothed hub rigid with one of the shafts to be coupled and a hub rigid with the other shaft having an interiorly toothed sleeve portion encircling the first named hub and in mesh with the teeth thereof, and means for restraining rotation of the ring gear of the speed changing unit, said means and flexible couplings enabling the speed changing unit to assume a position with respect to the driving and driven shafts such that it will be subject to a minimum of eccentric stresses.

3. Power transmission mechanism including a journaled driving shaft, a journaled driven shaft, a floating speed changing unit interposed between the driving and driven shafts, said unit having oppositely extending shafts and being of the planetary gear type having an internally toothed ring gear adapted to be restrained against rotation to enable said unit to transmit power, flexible couplings respectively connecting said oppositely extending shafts to the driving and driven shafts, said couplings constituting the sole support of said speed changing unit and each including a peripherally toothed hub rigid with one of the shafts to be coupled and a hub rigid with the other shaft having an interiorly toothed sleeve portion encircling the first named hub and in mesh with the teeth thereof, and flexible means connected to said ring gear for restraining rotation thereof, said flexible means being capable of permitting the axis of the speed changing unit to move angularly with respect to the axes of the driving and driven shafts.

WILLIAM G. HOFFMAN.